Dec. 19, 1967  P. A. CHOMBARD  3,358,515
DEVICE FOR REDUCING THE ACTION OF UNSTABLE PENDULUM
ERECTORS ON VERTICAL GYROSCOPES
Filed Aug. 10, 1965  2 Sheets-Sheet 1

Inventor
Pierre André Chombard
By
Karl W. Flocks
Attorney

Dec. 19, 1967  P. A. CHOMBARD  3,358,515
DEVICE FOR REDUCING THE ACTION OF UNSTABLE PENDULUM
ERECTORS ON VERTICAL GYROSCOPES
Filed Aug. 10, 1965  2 Sheets-Sheet 2

Inventor
Pierre André Chombard
By
Karl W. Flocks
attorney

United States Patent Office 3,358,515
Patented Dec. 19, 1967

3,358,515
DEVICE FOR REDUCING THE ACTION OF UN-
STABLE PENDULUM ERECTORS ON VERTICAL
GYROSCOPES
Pierre André Chombard, Boulogne-sur-Seine, France, assignor to Societe Francaise d'Equipements Pour la Navigation Aerienne, Neuilly-sur-Seine, France, a joint-stock company of France
Filed Aug. 10, 1965, Ser. No. 478,704
Claims priority, application France, Oct. 12, 1964, 991,165
3 Claims. (Cl. 74—5.44)

The present invention relates to a device for reducing the action of erectors having unstable pendulums on vertical gyroscopes.

It is known that vertical gyroscopes utilize an erector system responsive to the direction of the apparent vertical, which causes the gyroscope to precess in such manner that its axis continuously tends to align itself on this apparent vertical. The preceding system gives a fairly good vertical as long as the accelerations, other than that of gravity to which the aircraft is subjected, do not have a very great duration during which the axis of the gyroscope is liable to depart substantially from the vertical.

It is obviously not possible to design a device which can foresee the duration of an acceleration and eliminate the effect of the erector in consequence of this prediction. In practice, however, accelerations of a durable nature, other than gravity, which appear for example during turns or during running-up to speed after taking-off, or during slowing-down due to the operation of the air-brakes, have a value sufficient to deflect the apparent vertical by a substantial angle, and may therefore be indicated by the overstepping of an empirically fixed value by this angle.

In consequence, the axis of the gyroscope having been brought to the vertical before taking-off by the action of the erector while the aircraft was stationary, it may be presumed that if a device carried by the gyroscope and responsive to accelerations perpendicular or substantially perpendicular to the axis of the gyroscope, irrespective of their orientation in azimuth, eliminates or considerably reduces the effect of the erector when these accelerations exceed a value chosen as a compromise, the causes of the most important errors will have been eliminated and the effect on the quality of the vertical given by the axis of the gyroscope will be beneficial.

The object of the present invention is a device of this kind applied to erectors having rotating unstable pendulums which are already known, in particular to that described in French patent application No. 987,353 filed on Sept. 7, 1964, by the present applicants and entitled "Improvement in Erectors of Vertical Gyroscopes."

It is known that in erectors of this type, unstable pendulums of variable number but equal to or greater than 2, are supported by a moving system rotating at low speed about an axis parallel to the axis of the rotor of the gyroscope, and that this rotating system comprises a push-rod and a stop for each unstable pendulum, intended respectively when this is necessary, in the case of the push-rod to drive the corresponding unstable pendulum, and in the case of the stop to limit its movement about its axis.

When the common mean plane in which the various unstable pendulums oscillate is perpendicular to the apparent vertical, each of them is in contact with its push-rod and its movement about the axis of the rotating system is uniform and practically without effect on the gyroscope. When this is not the case, each of the unstable pendulums accelerates under the action of the component of the accelerations parallel to their plane of oscillation and leaves its push-rod for a part of each revolution of the rotating system; it is the asymmetric action of the apparent weight of the unstable pendulums during the course of each revolution which produces the erector torque.

The device in accordance with the invention is characterized in that it comprises detectors of accelerations parallel to the mean common plane of oscillation of the unstable pendulums, each of these detectors being associated with one of the unstable pendulums, and combined means in each of the assemblies constituted by a detector and the associated unstable pendulum, for reducing the erection action of the present device by reducing the movement of each of the unstable pendulums about its axis, starting from the moment when the acceleration detected by the corresponding detector reaches a pre-determined value.

In one preferred form of embodiment of the invention, each detector of accelerations parallel to the plane of oscillation of the unstable pendulums, is constituted by a pendulum, the shaft of which, supported by the rotating system of the erector, is perpendicular to the plane defined by the axis of rotation of the associated unstable pendulum and by the centre of gravity of this unstable pendulum when it is in contact with its push-rod, and the combined means for reducing the erection action of each pendulum consist, on each unstable pendulum, of a bracket comprising a rod and an upper arm, the foot of the rod being fixed on the upper face of the said pendulum and, on each detector pendulum, of a cranked lever integral with and oscillating with it, the free extremity of which comprises a curved-back end member so as to be engaged, starting from a pre-determined value of the component of the accelerations parallel to the common mean plane of oscillation of the unstable pendulum, under the upper arm of the bracket of the corresponding unstable pendulum.

The description given below, by way of example and without any limitation, of one particular form of construction of the present device will enable the invention to be more clearly understood, while at the same time bringing out other characteristic features and other advantages, reference being made to the accompanying drawings, in which.

Figure 3:
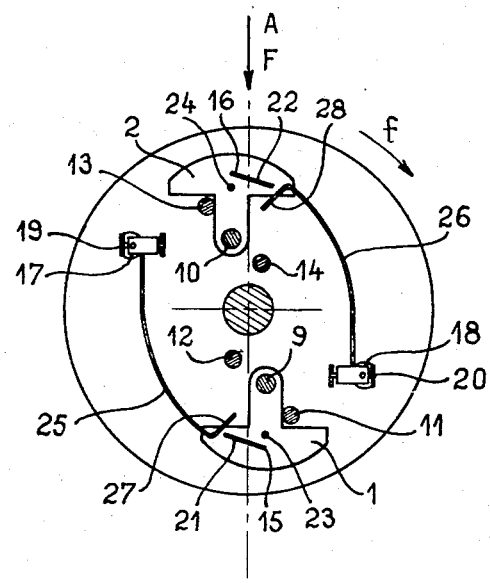
Figure 4:
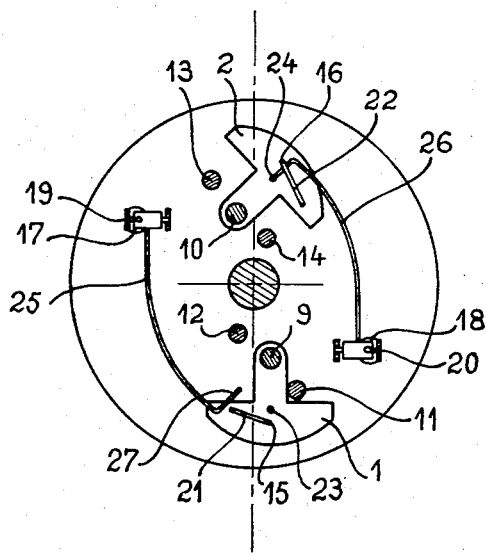

FIG. 3 is a diagram showing the elements of the device according to the invention, unstable pendulums and detector pendulums, when the component of the accelerations parallel to the common mean plane of oscillation of the two half-pendulums is parallel to each of the two planes defined respectively by the axis of one of the unstable pendulums and by its centre of gravity, each unstable pendulum being in contact with its push-rod;

FIG. 4 is a diagram similar to that of FIG. 3, but in which the end element of a detector pendulum is engaged under the bracket of the corresponding unstable pendulum and abuts against the vertical rod of the bracket.

Figure 1:
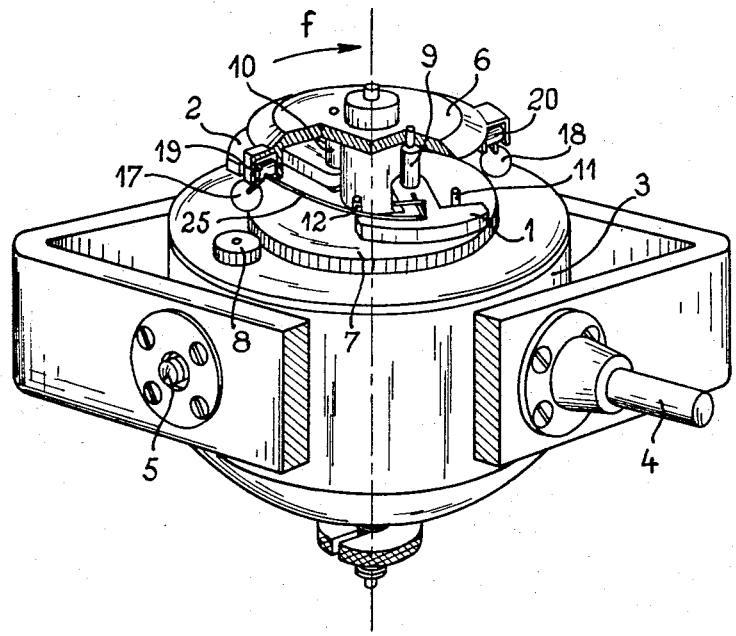
FIG. 1 is a perspective view, with parts broken away, representing a vertical gyroscope and its Cardan suspension, this gyroscope being equipped with an erector having two unstable pendulums which is in turn provided with the device according to the invention, the unstable pendulum shown in the drawing being in abutment against the end element of the cranked lever, which limits its travel.
Figure 2:
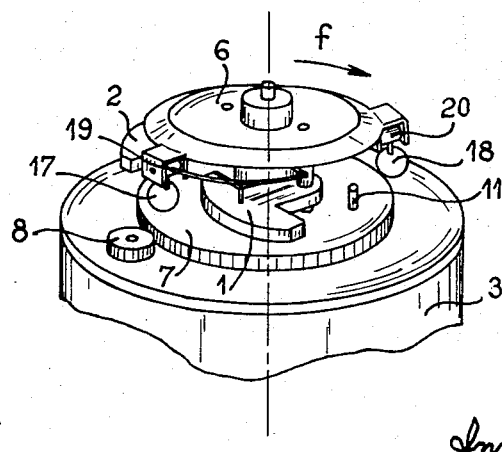
FIG. 2 is a perspective view of the casing of the gyroscope rotor and of the erector of FIG. 1, showing one of the two unstable pendulums in contact with its stop, in the case where the component of the accelerations in the common mean plane of oscillation of the two said half-pendulums is zero or does not have a value sufficient to reduce the action of erection.

The erection device with two unstable pendulums 1 and 2, shown in FIGS. 1 and 2, the vertical gyroscope, the rotor casing of which is indicated by the reference 3, being suspended by a Cardan suspension in conventional manner about the shafts 4 and 5, is provided with a rotating system formed by the upper plate 6 and the lower plate 7, coaxial with the rotor of the gyroscope 3 and forming a single unit with each other. The lower plate 7 engages with the end pinion 8 of a train of reduction gears (not shown), housed in the casing 3 of the rotor and driven from the rotor shaft. The two plates 6 and 7 are provided with spacing struts 9 and 10, about which the two unstable pendulums 1 and 2 can respectively oscillate.

The lower plate 7 is provided with a push-rod 11 and a stop 12 corresponding to the unstable pendulum 1 and a push-rod 13 and a stop 14 (not shown in FIGS. 1 and 2), corresponding to the other unstable pendulum 2. The unstable pendulums 1 and 2 each carry a bracket 15 and 16 on their upper face, as also shown in FIG. 3. Each unstable pendulum 1 and 2 is associated with a pendulum 17 and 18 serving as a detector of accelerations parallel to the mean common plane of oscillation of the said unstable pendulums.

The pendulum 17, 18 can oscillate about a shaft 19, 20, housed in the upper plate 6, this shaft being perpendicular to the plane defined by the particular axis 9, 10 of the corresponding unstable pendulum 1, 2 and its centre of gravity 23, 24 when the said pendulum is in contact with its push-rod 11, 13. Each of the detector pendulums 17, 18 comprises a cranked lever 25, 26 made in a single piece with its shaft 19, 20.

The free extremity of each of the levers 25, 26 terminates in an end element substantially at right angles, perpendicular to the shaft 9, 10 of the unstable pendulum 1, 2 corresponding, and directed towards the said shaft.

The device according to the invention operates in the following manner:

When the component A of the accelerations parallel to the mean common plane of oscillation of the two unstable pendulums 1 and 2 is directed following the arrow F (see FIG. 3), that is to say substantially perpendicular to the shaft 19 of the pendulum 17, the lever 25 swings about the said shaft 19 and is lifted upwards. The plate 6 and 7 rotating in the direction $f$, the unstable pendulum 1 remains applied against its push-rod 11 for the following half-turn, in view of the direction of the component A.

During this time, on the one hand the lever 26 fixed to the detector pendulum 18, is inclined downwards about the shaft 20 under the action of the component A, and on the other hand, the unstable pendulum 2 has a tendency to leave its push-rod 13 under the action of the same component A. Depending on the value of the component A, two cases are to be considered:

The component A is greater than a pre-determined value, and the end element 28 of the lever 26 is engaged under the upper arm 22 of the bracket of the unstable pendulum 2 and strikes against the rod 16 of the bracket. The free travel of the unstable pendulum 2 is thus reduced, as is also, in consequence, its erection action on the gyroscope; the upper arm 2 of the bracket prevents the end element 28 from escaping under the effect of possible vibration which would render the operation of the device doubtful and, in particular, maintains the abutment even when the detector pendulum 18 tends to cause it to escape; this escape can only take place after the unstable pendulum has become aligned downwards with the direction of the component A, and in consequence cannot carry out a travel greater than that which has been defined by the end element 28.

The component A is less than the said predetermined value; the unstable pendulum 2 retains its maximum free travel.

The braking effect applied by the friction of the end element 28 on the upper arm 21 of the bracket for values of the component A slightly less than the pre-determined value slows-down the fall of the unstable pendulums and for this reason already results in a reduction of the erection effect which ensures a certain progressiveness in the passage between the two conditions of the erector, corresponding to the total travel and the limited travel of the unstable pendulums.

The same phenomena are reproduced as long as the acceleration A subsists, each of the unstable pendulums taking the place of the other after a half-revolution of the rotating system.

Finally, the device according to the invention makes it possible to establish the erection effect at a new and lower value, which is furthermore adjustable, starting from a certain pre-determined value of the component of the acceleration parallel to the mean common plane of oscillation of the unstable pendulums, while ensuring a certain progressiveness in this effect.

The fixing of the pre-determined value of A envisaged above is possible by acting on the length of the levers 25, 26 and on the height of the brackets 15, 16.

It is also possible to regulate these values differently for each of the unstable pendulums so as to spread out the progressiveness of the effect.

It will be understood that the present invention has been described solely by way of explanation and not in any limitative sense, and that it is possible to introduce thereto modifications of detail without thereby departing from its scope.

I claim:

1. In an erector of the unstable-pendulum type for vertical gyroscopes, said unstable pendulums being supported by a moving system rotating at low speed about an axis parallel to the spin axis of the gyroscope rotor and said rotating system comprising one push-rod for actuating each unstable pendulum and one stop for each unstable pendulum so as to limit the natural oscillation of said pendulum; a device for reducing the effective action of said erector, said device comprising a plurality of detectors for sensing accelerations parallel to the mean common plane of oscillation of said unstable pendulums, each of said dectectors being associated with one of said unstable pendulums, and combined means in each assembly comprised by a said detector and its associated unstable pendulum for reducing the erecting action of said device by reducing the movement of each said unstable pendulum about its axis, at and from the moment when the acceleration detected by the corresponding detector attains a pre-determined value.

2. A device as claimed in claim 1, in which each detectors of accelerations parallel to the mean plane of oscillation of said unstable pendulums is constituted by a second pendulum having its axis supported by the rotating system of said erector and perpendicular to the plane defined by the axis of rotation of the associated unstable pendulum and by the centre of gravity of said unstable pendulum when said latter pendulum is in contact with its push-rod.

3. A device as claimed in claim 1, in which said combined means for reducing the erection action of each detector-unstable pendulum assembly comprises a bracket on each unstable pendulum, said bracket comprising a rod and an upper arm, the foot of said rod being fixed on the upper face of said pendulum, and a cranked lever on each detector pendulum, said lever being fast with and oscillating with said pendulum, the free extremity of each lever comprising an end-element curved back in such manner as to be engaged under the upper arm of the bracket of the corresponding unstable pendulum at and above a pre-determined value of the component of the accelerations parallel to the mean common plan of oscillation of said unstable pendulum.

References Cited

UNITED STATES PATENTS 1,311,768  7/1919  Gray _____ 74—5.44
2,351,619  6/1944  Kimball _____ 74—5.44

FRED C. MATTERN, JR., *Primary Examiner.*

J. D. PUFFER, C. J. HUSAR, *Assistant Examiners.*